US012146604B2

(12) United States Patent
Kuo et al.

(10) Patent No.: US 12,146,604 B2
(45) Date of Patent: Nov. 19, 2024

(54) ELECTRONIC ASSEMBLY

(71) Applicant: Primax Electronics Ltd., Taipei (TW)

(72) Inventors: Wei-Ching Kuo, Taipei (TW); Rong-Fu Lee, Taipei (TW)

(73) Assignee: Primax Electronics Ltd., Taipei (TW)

( * ) Notice: Subject to any disclaimer, the term of this patent is extended or adjusted under 35 U.S.C. 154(b) by 231 days.

(21) Appl. No.: 18/086,450

(22) Filed: Dec. 21, 2022

(65) Prior Publication Data

US 2024/0134418 A1  Apr. 25, 2024
US 2024/0231431 A9  Jul. 11, 2024

(30) Foreign Application Priority Data

Oct. 24, 2022 (TW) .................................. 111140185

(51) Int. Cl.
*F16M 11/04* (2006.01)
(52) U.S. Cl.
CPC .......... *F16M 11/04* (2013.01); *F16M 11/041* (2013.01); *F16M 2200/02* (2013.01); *Y10T 292/0834* (2015.04); *Y10T 292/084* (2015.04)
(58) Field of Classification Search
CPC ...... G06F 1/1632; G06F 1/181; G06F 1/1633; F16M 11/04; F16M 11/16; F16M 11/041; F16M 2200/02; H05K 5/0004; H05K 5/0221; E05C 1/08; E05C 1/00; E05C 9/045; Y10T 292/0834; Y10T 292/084; Y10T 292/1016; Y10T 292/0999; H01R 12/70
USPC ........................ 361/679.41–679.44
See application file for complete search history.

(56) References Cited

U.S. PATENT DOCUMENTS

| | | | | |
|---|---|---|---|---|
| 3,545,799 A * | 12/1970 | Gertsfeld | .............. | E05B 63/122 70/120 |
| 3,792,884 A * | 2/1974 | Tutikawa | ................ | E05C 9/047 292/179 |
| 5,149,152 A * | 9/1992 | Lanius | .................... | E05C 9/045 292/37 |
| 5,975,592 A * | 11/1999 | Lin | ........................... | E05C 1/06 292/159 |
| 7,152,443 B2 * | 12/2006 | Chang | ................... | E05B 65/006 70/120 |
| 8,104,801 B2 * | 1/2012 | Wang | ................. | H01M 50/216 220/784 |

(Continued)

*Primary Examiner* — Hiwot E Tefera
(74) *Attorney, Agent, or Firm* — KIRTON McCONKIE; Evan R. Witt

(57) ABSTRACT

An electronic assembly includes an electronic device and an external device. The electronic device includes a main body and a fixing base. The main body includes a first opening. The fixing base includes an upper cover, a cam, a first spring, a button, a second spring, a pedestal, a first retractable hook and a second retractable hook. The first retractable hook includes a first inclined protrusion structure. The second retractable hook includes a second inclined protrusion structure. The external device includes a bracket. The bracket includes a first insertion piece and a second insertion piece. The first insertion piece includes a seventh opening. The second insertion piece includes an eighth opening. The first insertion piece and the second insertion piece are penetrated through the first opening. The first inclined protrusion structure is inserted into the seventh opening. The second inclined protrusion structure is inserted into the eighth opening.

10 Claims, 16 Drawing Sheets

(56) References Cited

U.S. PATENT DOCUMENTS

| | | | |
|---|---|---|---|
| 10,568,220 B2* | 2/2020 | Wu | H05K 5/0221 |
| 2009/0212586 A1* | 8/2009 | Blanck | B60R 7/04 |
| | | | 296/37.8 |
| 2014/0049055 A1* | 2/2014 | Shih | E05C 7/00 |
| | | | 292/162 |
| 2014/0225379 A1* | 8/2014 | Fukumoto | E05C 9/045 |
| | | | 292/40 |
| 2021/0018139 A1* | 1/2021 | Xiang | F16M 11/041 |
| 2022/0186764 A1* | 6/2022 | Lee | F16M 11/105 |

* cited by examiner

ELECTRONIC ASSEMBLY

FIELD OF THE INVENTION

The present invention relates to an electronic assembly, and more particularly to an electronic assembly with a mechanism for fixing/detaching an electronic device and an external device on/from each other.

BACKGROUND OF THE INVENTION

Generally, a docking device is one of electronic devices that can provide connection interfaces with various specifications. The use of the docking device can achieve the expansion function.

In case that an external device such as a lighting device or a camera is installed on a multi-functional docking device, signals or electric power can be transmitted through the connection interfaces. However, the structure of the multi-functional docking device still has some drawbacks. For example, the multi-functional docking device has no suitable mechanism for fixing, detaching or replacing the external device.

In other words, the multi-functional docking device needs to be further improved.

SUMMARY OF THE INVENTION

In order to overcome the drawbacks of the conventional technologies, the present invention provides an electronic assembly with an electronic device and an external device. The electronic assembly is equipped with a fixing mechanism and a detaching mechanism on the electronic device and the external device. Consequently, the electronic assembly is more user-friendly.

In accordance with an aspect of the present invention, an electronic assembly is provided. The electronic assembly includes an electronic device and an external device. The electronic device includes a main body and a fixing base. The main body includes a first opening. The fixing base is disposed within the main body. The fixing base includes an upper cover, a cam, a first spring, a button, a second spring, a pedestal, a first retractable hook and a second retractable hook. The upper cover includes a top wall, a first lateral wall, a second lateral wall and a hollow post. The first lateral wall and the second lateral wall are protruded downwardly from the top wall. The first lateral wall and the second lateral wall are opposed to each other. The first lateral wall has a second opening. The second lateral wall has a third opening. The hollow post is arranged between the first lateral wall and the second lateral wall. The hollow post is protruded downwardly from the top wall. The hollow post includes a first concave structure and a first guiding track. The first concave structure includes an annular inner wall. The first guiding track is concavely and inclinedly formed in the annular inner wall. The first guiding track includes a first track bottom, a first track top and a first inlet. The cam includes an outer ring, a central post, a separation structure and a second concave structure. The outer ring is arranged around the separation structure and perpendicular to the separation structure. The separation structure is arranged between the central post and the second concave structure. The outer ring includes a first external protrusion structure and a second external protrusion structure. The central post includes an outer wall and a first guiding block. The first guiding block is disposed on the outer wall. When the central post is upwardly inserted into the hollow post, the first guiding block is introduced into the first track bottom through the first inlet. The first spring is arranged between the first concave structure and the central post. The button is located under the cam. The button includes a head part and a pressing part. The second spring is arranged between the head part of the button and the second concave structure. The first spring, the cam, the second spring and the head part of the button are accommodated within a space between the upper cover and the pedestal. The pedestal includes a fourth opening, a first stopping structure and a second stopping structure. The pressing part of the button is exposed outside the fourth opening. A portion of the head part is contacted with an inner surface of the fourth opening. The first stopping structure is arranged between the cam and the first lateral wall. The first stopping structure includes a fifth opening. The second stopping structure is arranged between the cam and the second lateral wall. The second stopping structure includes a sixth opening. The first retractable hook is arranged between the first lateral wall and the first stopping structure. The first retractable hook includes a first inclined protrusion structure, a third stopping structure, a first bolt and a third spring. The first inclined protrusion structure is protruded out through the second opening. The third stopping structure is arranged between the first inclined protrusion structure and the first bolt. The first bolt is penetrated through the fifth opening and contacted with the outer ring. The third spring is arranged between the first lateral wall and the third stopping structure. The second retractable hook is arranged between the second lateral wall and the second stopping structure. The second retractable hook includes a second inclined protrusion structure, a fourth stopping structure, a second bolt and a fourth spring. The second inclined protrusion structure is protruded out through the third opening. The fourth stopping structure is arranged between the second inclined protrusion structure and the second bolt. The second bolt is penetrated through the sixth opening and contacted with the outer ring. The fourth spring is arranged between the second lateral wall and the fourth stopping structure. The external device includes a bracket. The bracket includes a first insertion piece and a second insertion piece. The first insertion piece includes a seventh opening. The second insertion piece includes an eighth opening. When the external device is installed on the electronic device, the first insertion piece and the second insertion piece are penetrated through the first opening, the first inclined protrusion structure is inserted into the seventh opening, and the second inclined protrusion structure is inserted into the eighth opening.

In an embodiment, when the first guiding block of the cam is located at the first track bottom, the first bolt is pushed by the first external protrusion structure, so that the first inclined protrusion structure is protruded out of the second opening. While the first guiding block of the cam is moved in a direction from the first track bottom to the first track top, the cam is correspondingly rotated, and the first external protrusion structure and the first bolt are separated from each other, so that the first inclined protrusion structure is retracted back into the second opening.

In an embodiment, when the pressing part of the button is pressed, the button is moved to push the cam, so that the first guiding block of the cam is moved in the direction from the first track bottom to the first track top. When the button is not pressed, the cam is returned to an original position of the cam through the first spring, and the button is returned to an original position of the button through the second spring.

In an embodiment, when the first bolt is pushed by the first external protrusion structure and the first inclined protrusion structure is protruded out of the second opening, the third spring is compressed. When the cam is rotated and the first external protrusion structure and the first bolt are separated from each other, the third spring is released, so that the first inclined protrusion structure is retracted back into the second opening.

In an embodiment, the main body further includes a bottom plate, and the bottom plate includes a fifth stopping structure and a sixth stopping structure. The fifth stopping structure is located beside the first lateral wall and in parallel with the first lateral wall. A first insertion groove is defined by the fifth stopping structure and the first lateral wall collaboratively. The sixth stopping structure is located beside the second lateral wall and in parallel with the second lateral wall. A second insertion groove is defined by the sixth stopping structure and the second lateral wall collaboratively.

In an embodiment, while the external device is installed on the electronic device, the first insertion piece is inserted into the first insertion groove, and the first inclined protrusion structure is pressed by the first insertion piece, so that the first inclined protrusion structure is retracted back into the second opening. When the first insertion piece is continuously inserted into the first insertion groove and the seventh opening is aligned with the second opening, the first inclined protrusion structure is protruded out of the second opening and inserted into the seventh opening.

In an embodiment, the hollow post further includes a second guiding track, and the central post further includes a second guiding block. The second guiding track is concavely and inclinedly formed in the annular inner wall. The second guiding track includes a second track bottom, a second track top and a second inlet. The second guiding block is disposed on the outer wall. When the central post is upwardly inserted into the hollow post, the second guiding block is introduced into the second track bottom through the second inlet.

In an embodiment, when the second guiding block of the cam is located at the second track bottom, the second bolt is pushed by the second external protrusion structure, so that the second inclined protrusion structure is protruded out of the third opening. While the second guiding block of the cam is moved in a direction from the second track bottom to the second track top, the cam is correspondingly rotated, and the second external protrusion structure and the second bolt are separated from each other, so that the second inclined protrusion structure is retracted back into the third opening.

In an embodiment, when the pressing part of the button is pressed, the head part of button is moved to push the cam, so that the first guiding block of the cam is moved in the direction from the first track bottom to the first track top and the second guiding block of the cam is moved in the direction from the second track bottom to the second track top. When the button is not pressed, the cam is returned to an original position of the cam through the first spring, and the button is returned to an original position of the button through the second spring.

In an embodiment, the electronic device is a multi-functional docking device, and the external device is a lighting device or a camera.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1:
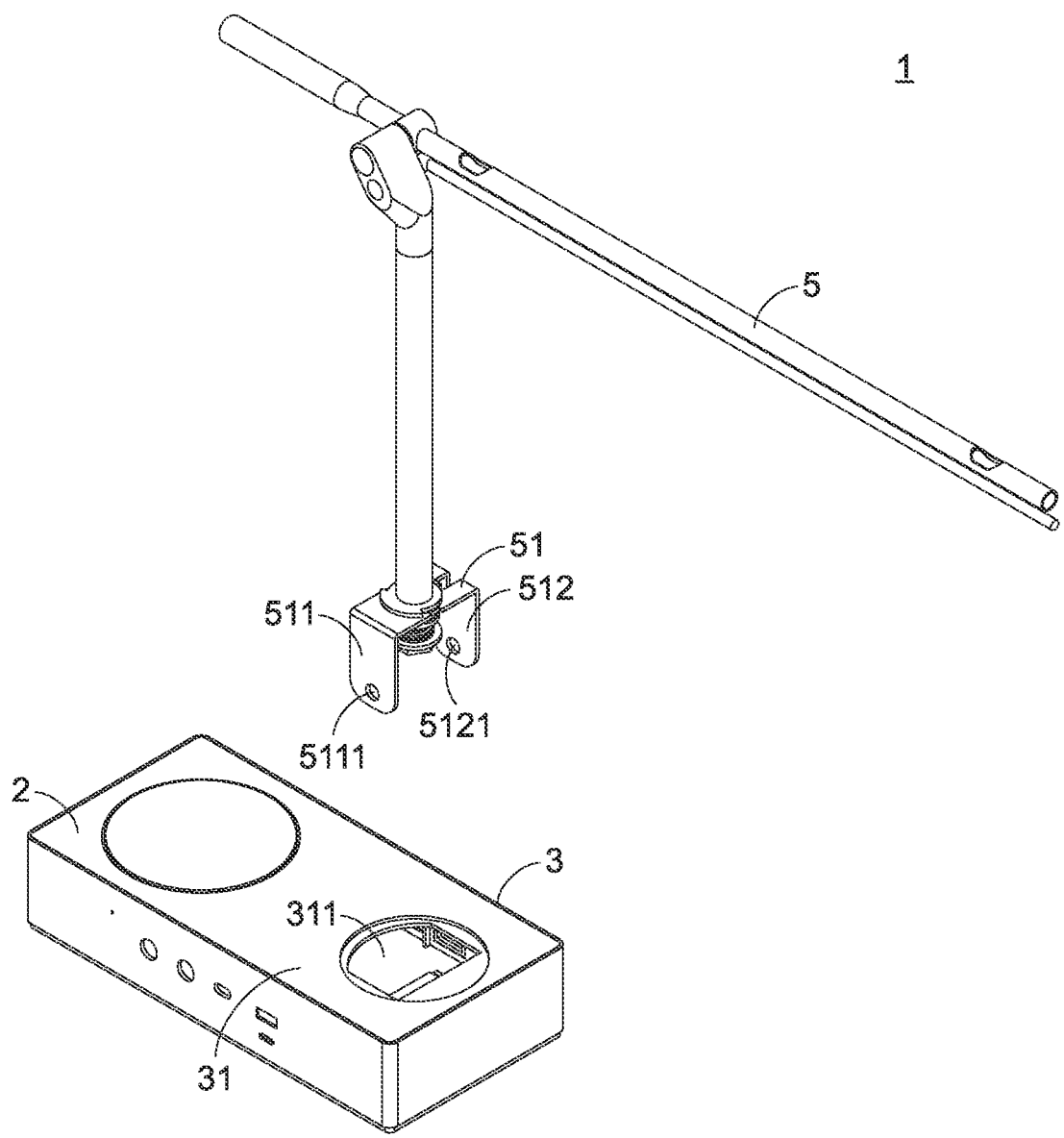
FIG. 1 is a schematic exploded view illustrating an electronic assembly according to an embodiment of the present invention.
Figure 2:
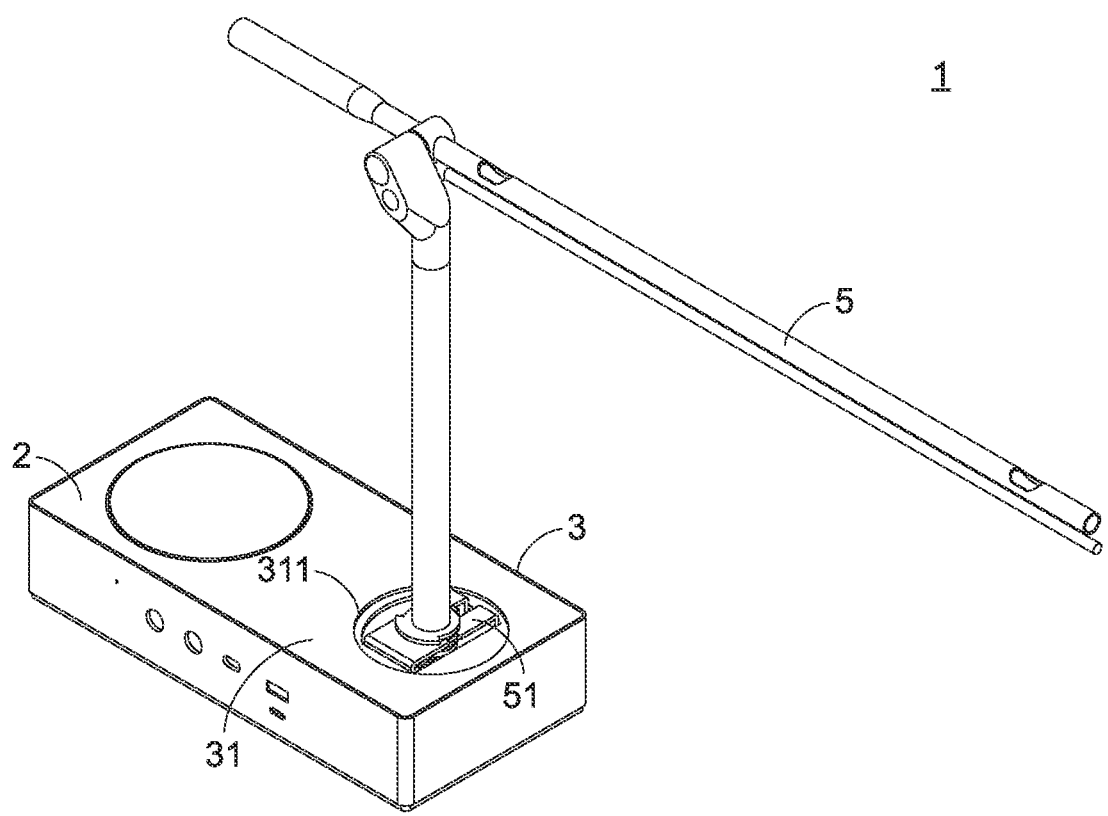
FIG. 2 is a schematic perspective view illustrating the electronic assembly as shown in FIG. 1.
Figure 3:
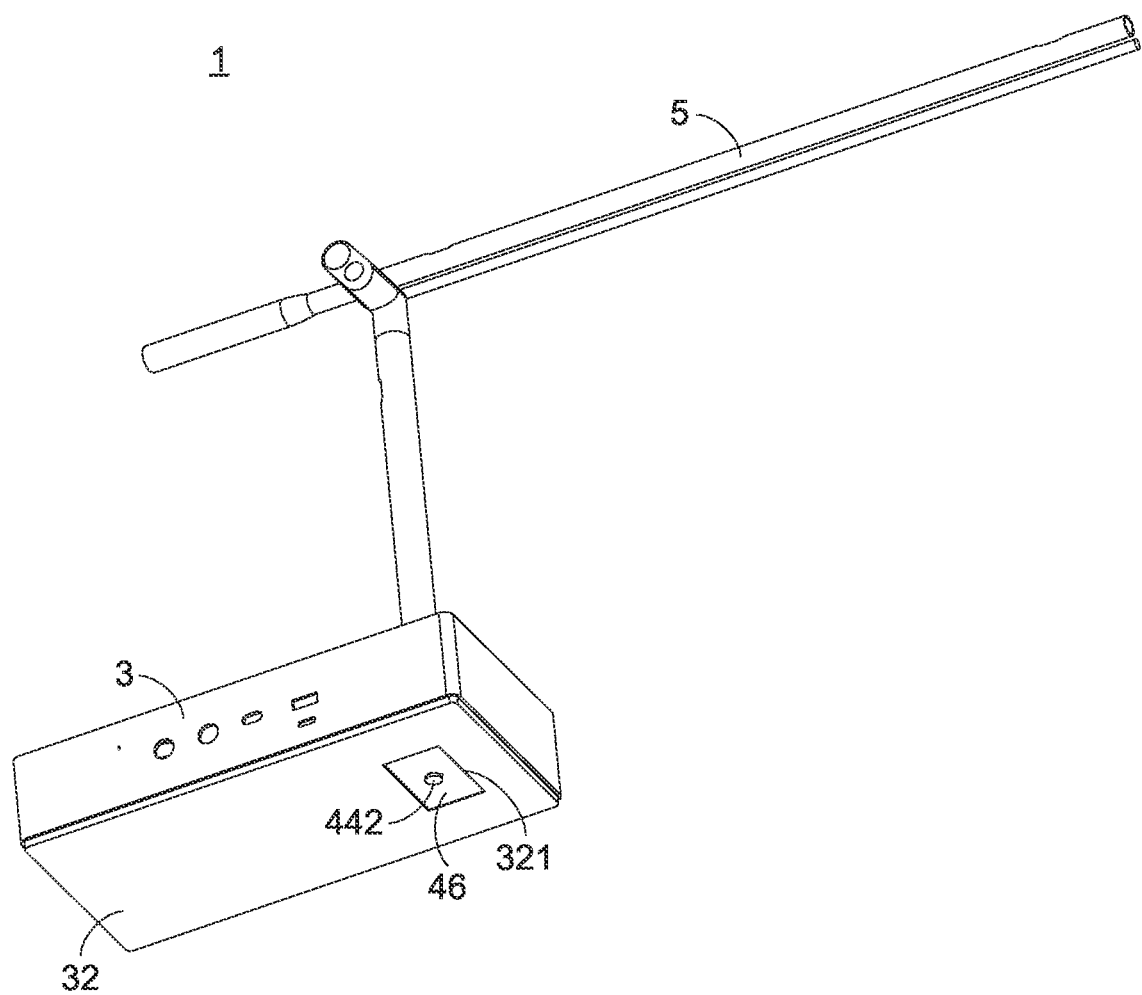
FIG. 3 is a schematic perspective view illustrating the electronic assembly as shown in FIG. 2 and taken along another viewpoint.
Figure 4:
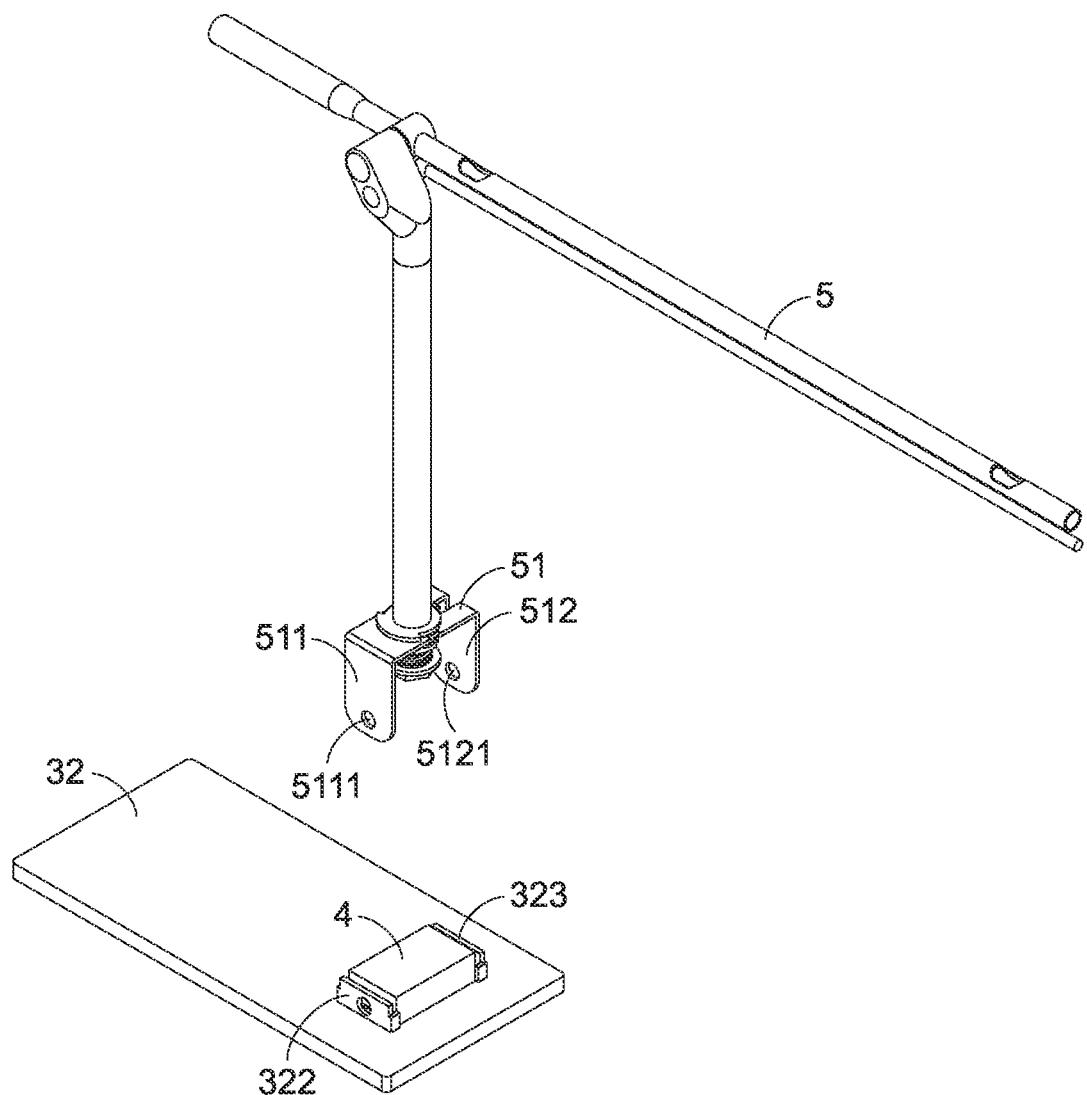
FIG. 4 is a schematic exploded view illustrating a portion of the electronic assembly as shown in FIG. 1.
Figure 5:
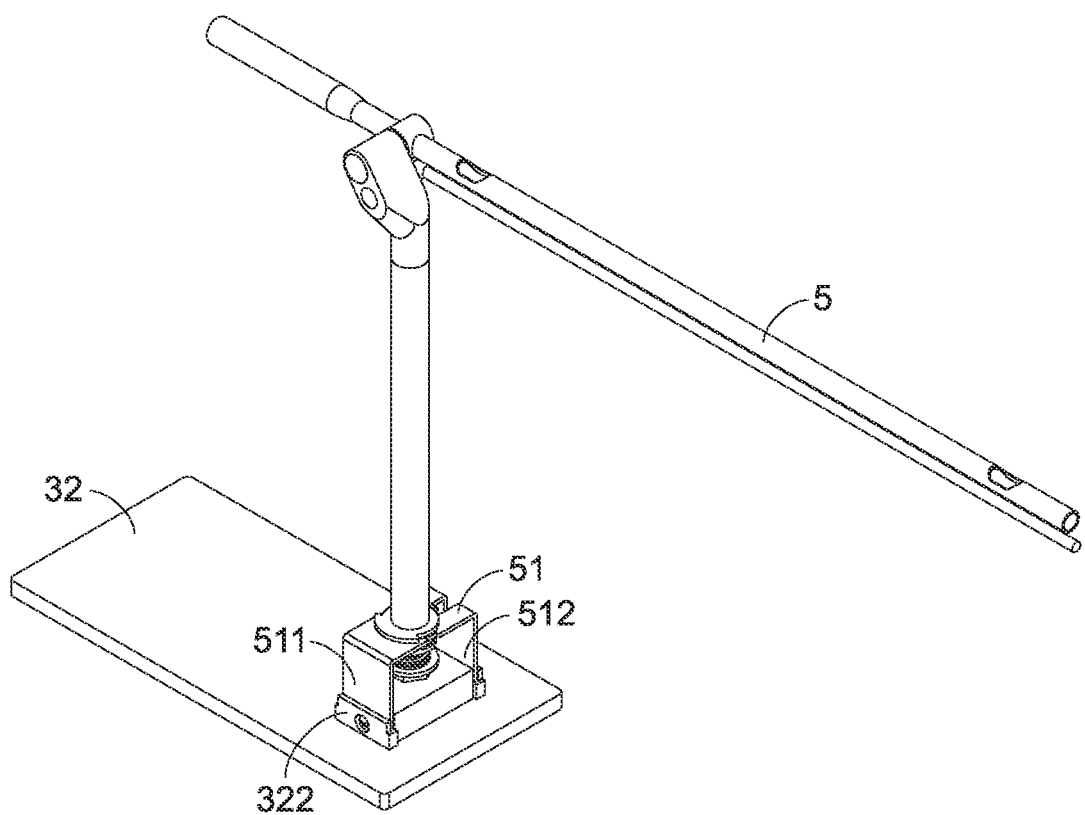
FIG. 5 is a schematic perspective view illustrating a portion of the electronic assembly as shown in FIG. 1.
Figure 6:
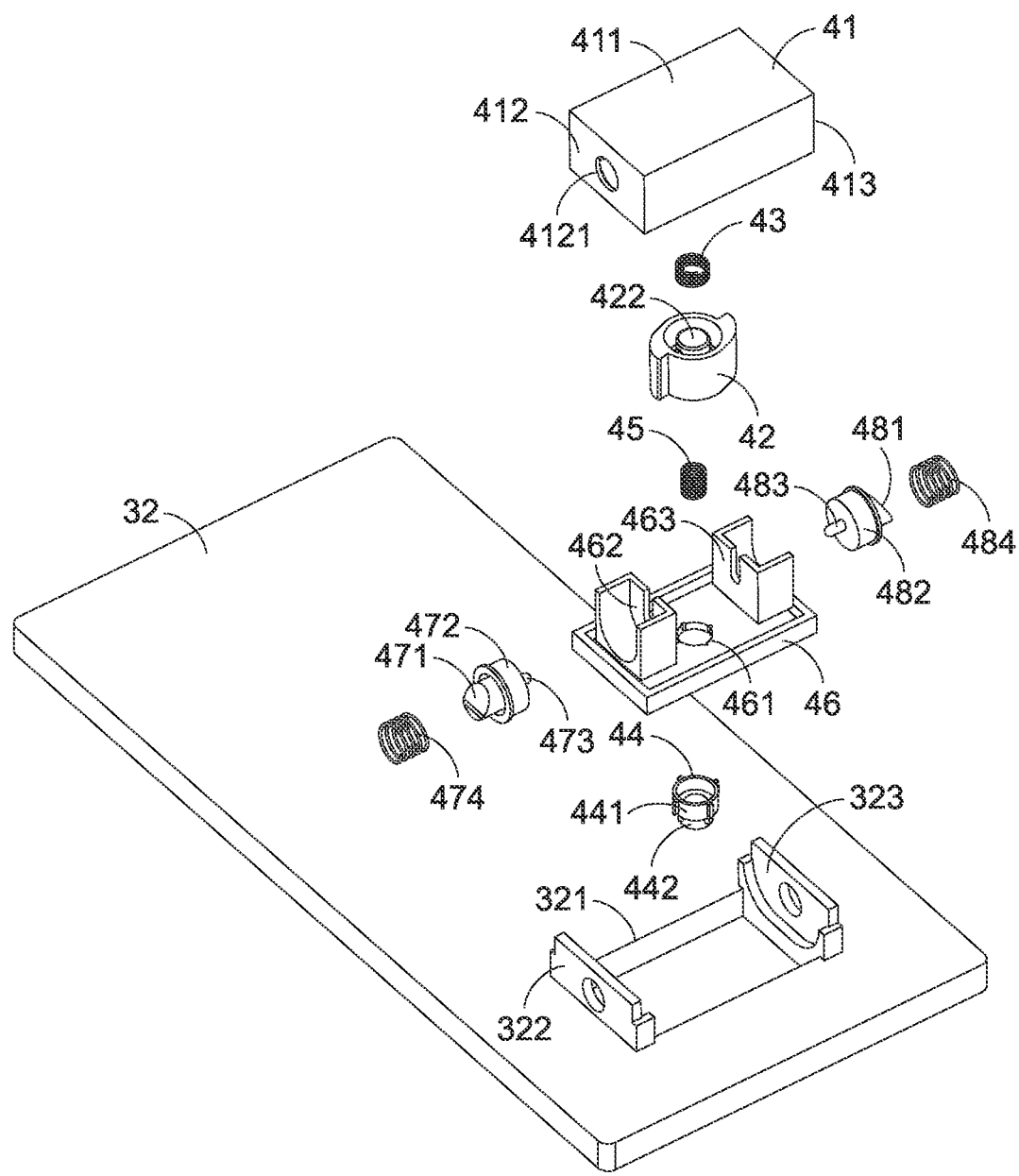
FIG. 6 is a schematic exploded view illustrating a portion of the main body and the fixing base in the electronic device according to the embodiment of the present invention.
Figure 7:
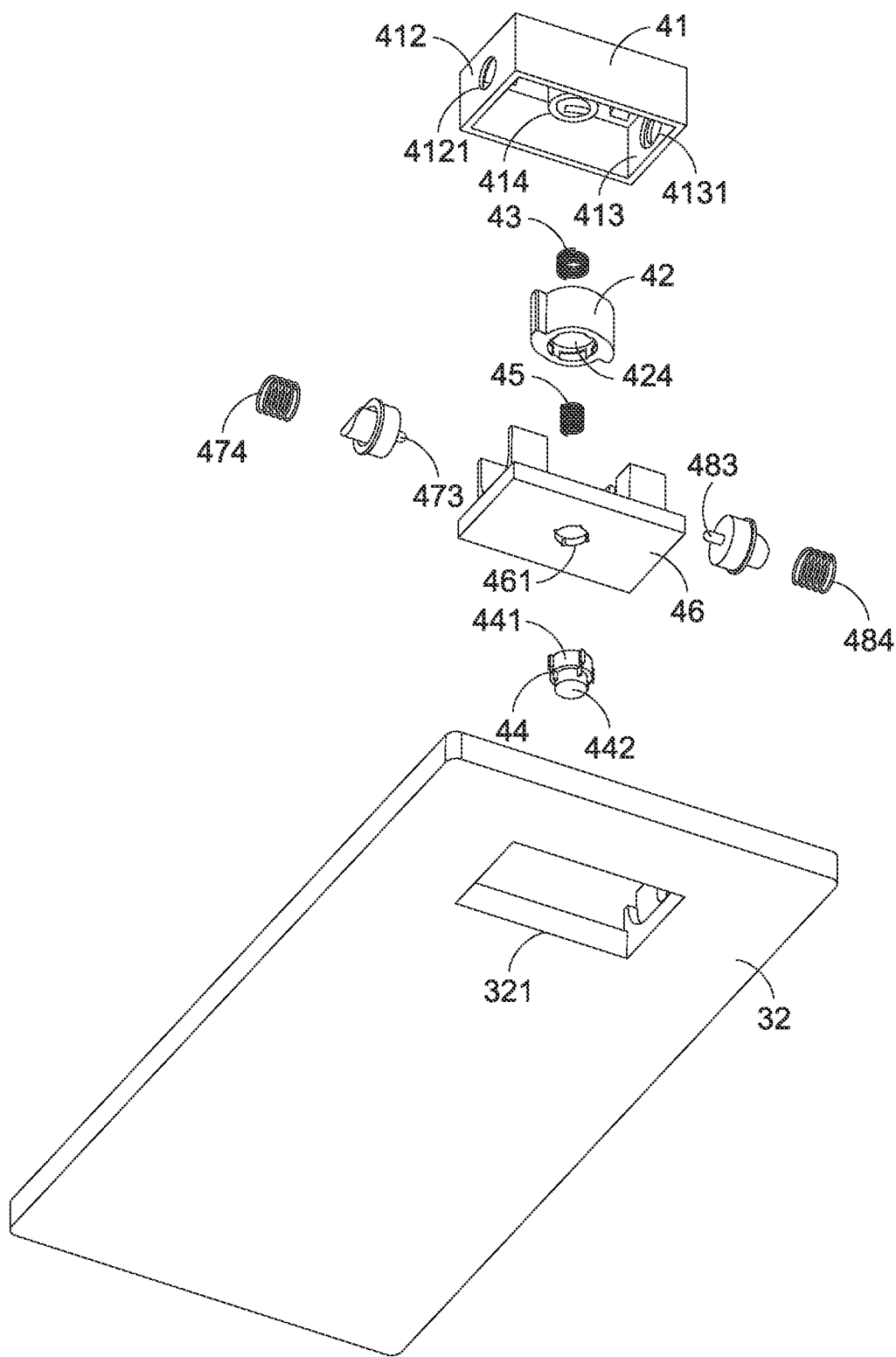
FIG. 7 is a schematic exploded view illustrating a portion of the main body and the fixing base in the electronic device as shown in FIG. 6 and taken along another viewpoint.
Figure 8:
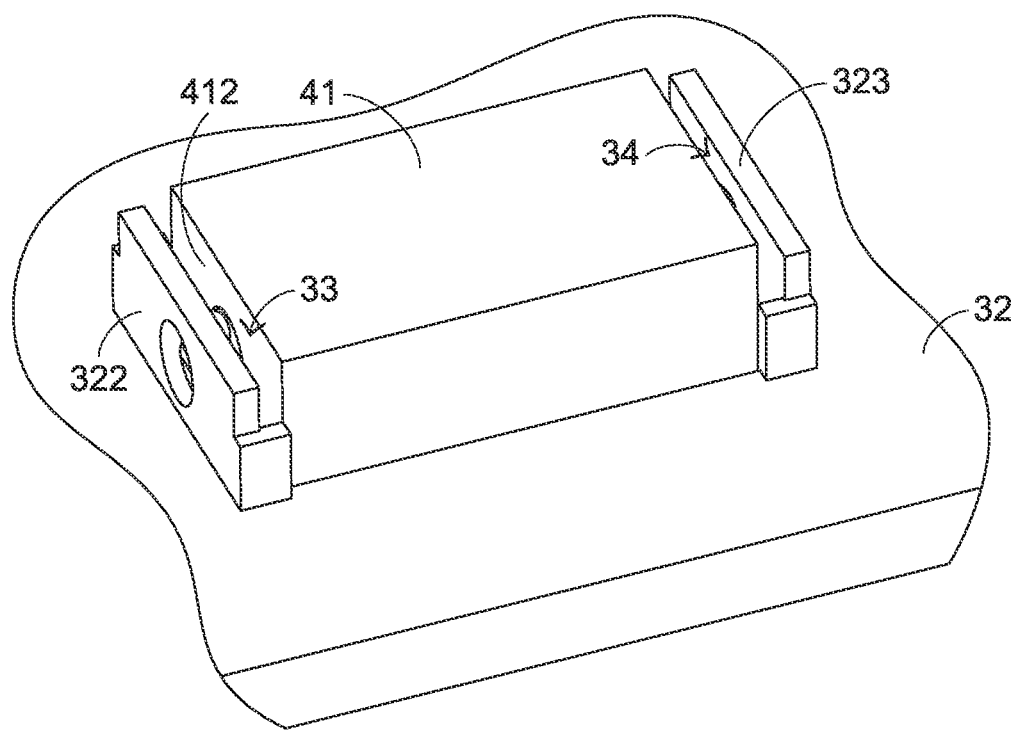
FIG. 8 is a schematic perspective view illustrating a portion of the main body and the fixing base of the electronic device according to the embodiment of the present invention.
Figure 9:
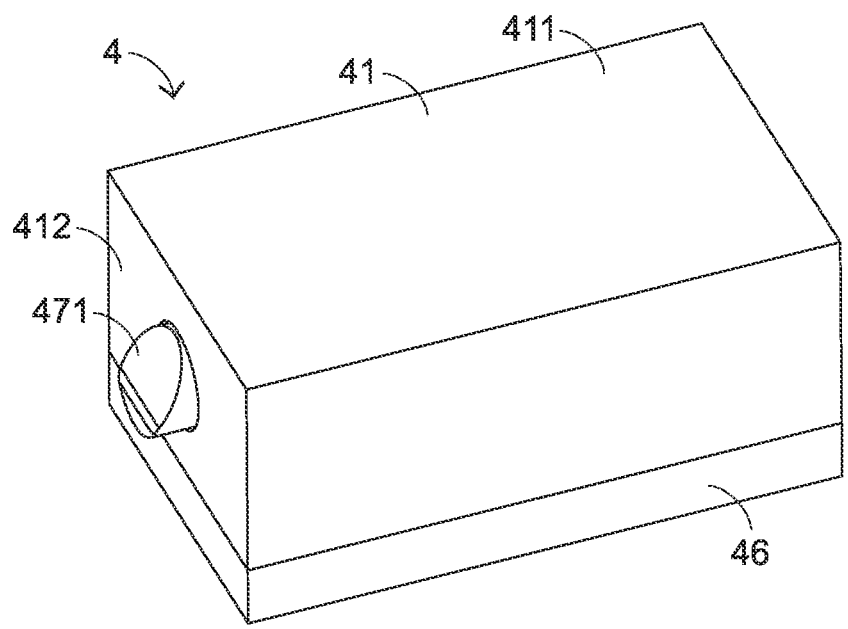
FIG. 9 is a schematic perspective view illustrating the fixing base of the electronic device according to the embodiment of the present invention.
Figure 10:
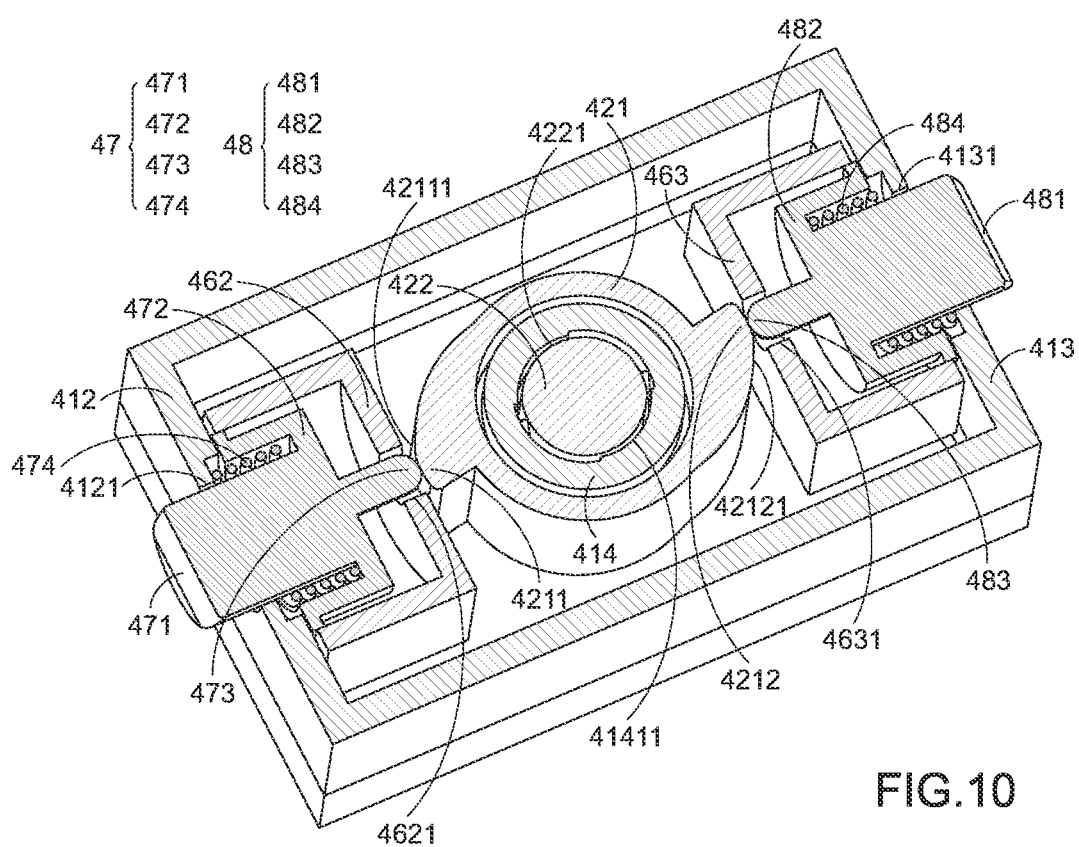
FIG. 10 is a schematic cutaway and perspective view illustrating the retractable hooks and the cam of the fixing base when the fixing base is in a normal operating mode.
Figure 11:
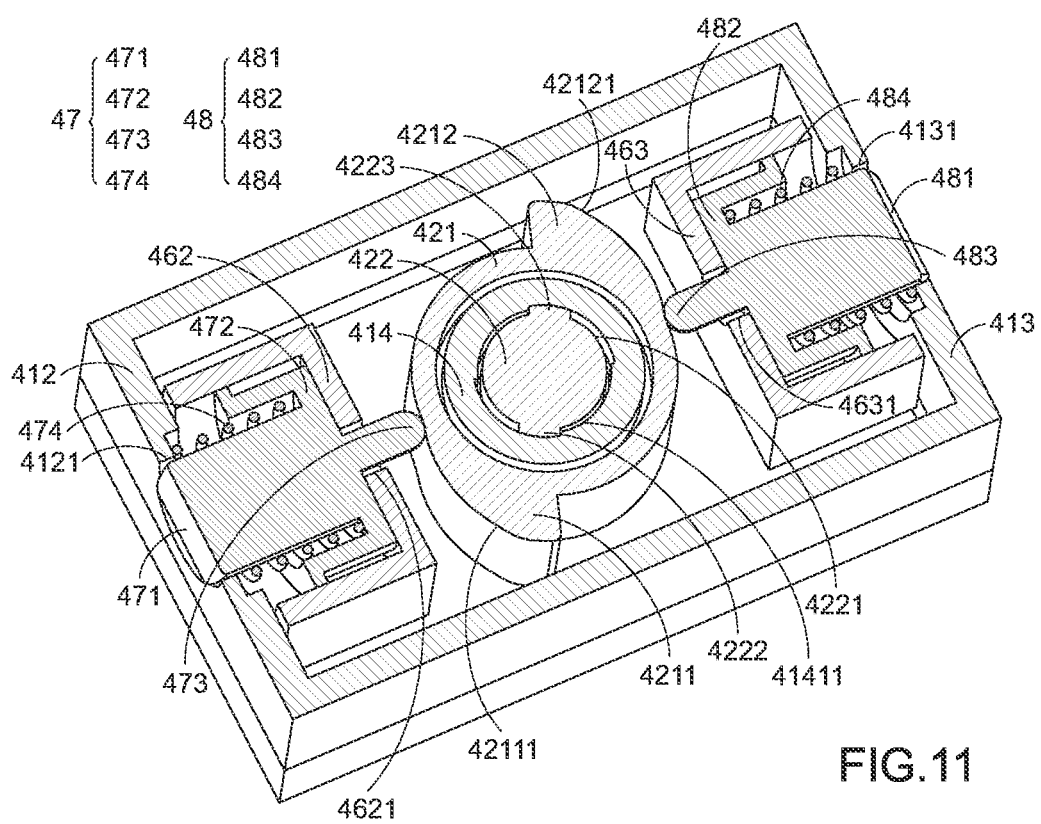
FIG. 11 is a schematic cutaway and perspective view illustrating the retractable hooks and the cam of the fixing base while the external device is installed on the fixing base.
Figure 12:
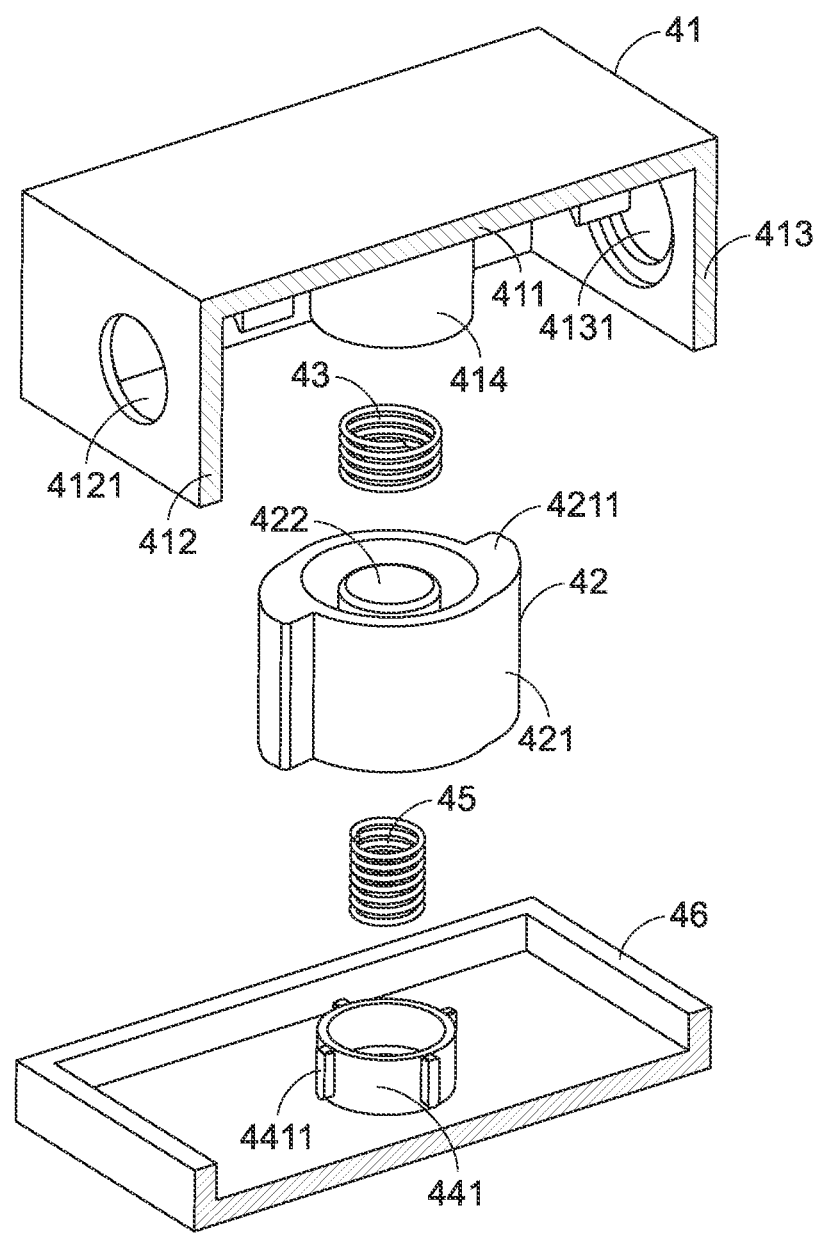
FIG. 12 is a schematic cutaway and exploded view illustrating the upper cover, the first spring, the cam, the second spring, the button and the pedestal of the fixing base and taken along a viewpoint.
Figure 13:
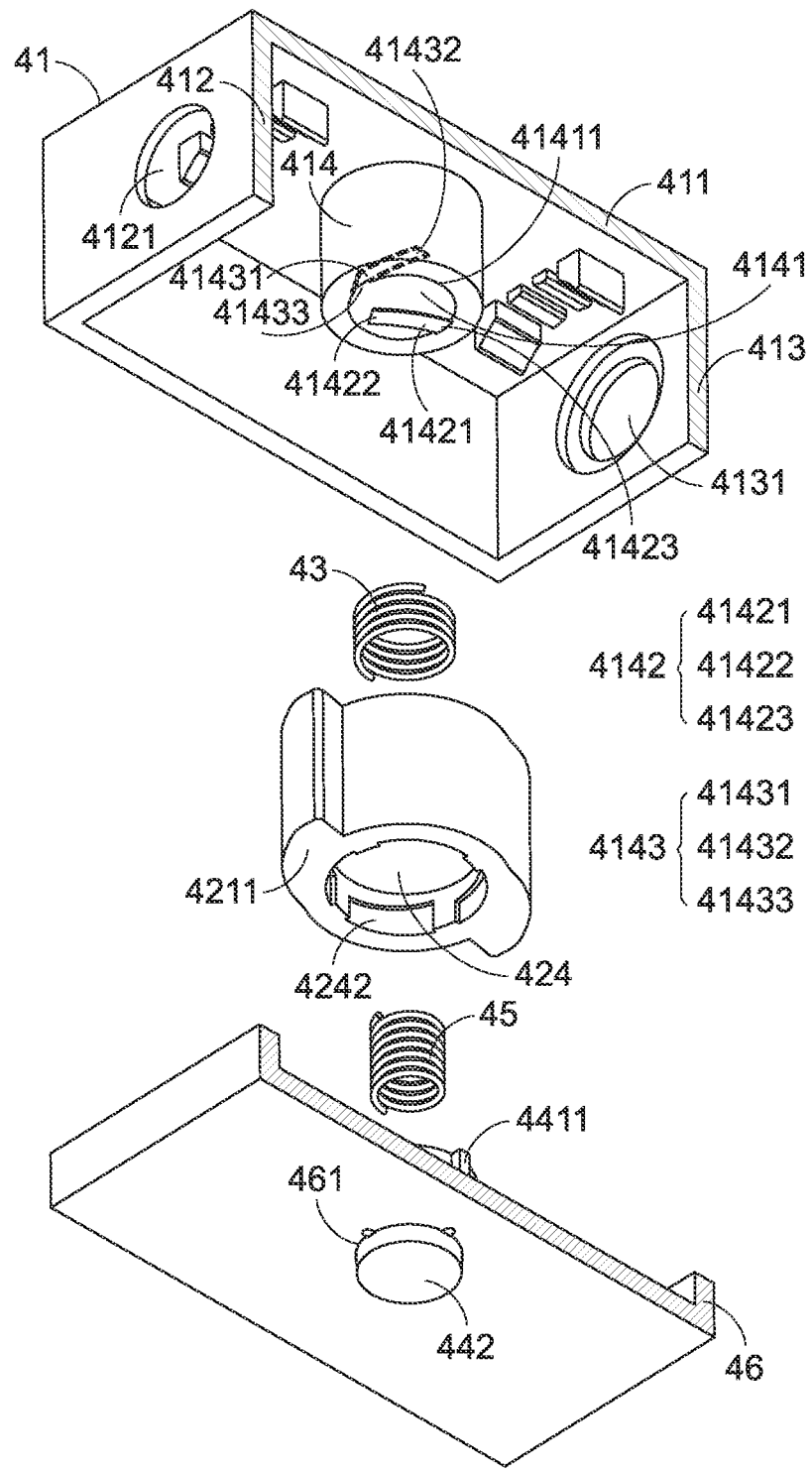
FIG. 13 is a schematic cutaway and exploded view illustrating the upper cover, the first spring, the cam, the second spring, the button and the pedestal of the fixing base and taken along another viewpoint.
Figure 14:
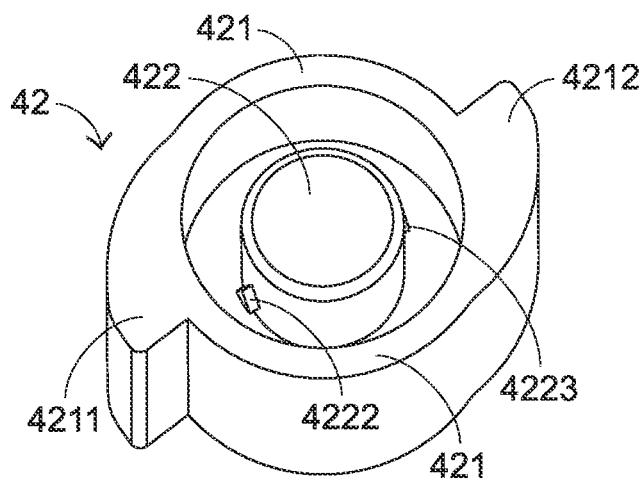
FIG. 14 is a schematic perspective view illustrating the cam of the fixing base and taken along a viewpoint.
Figure 15:
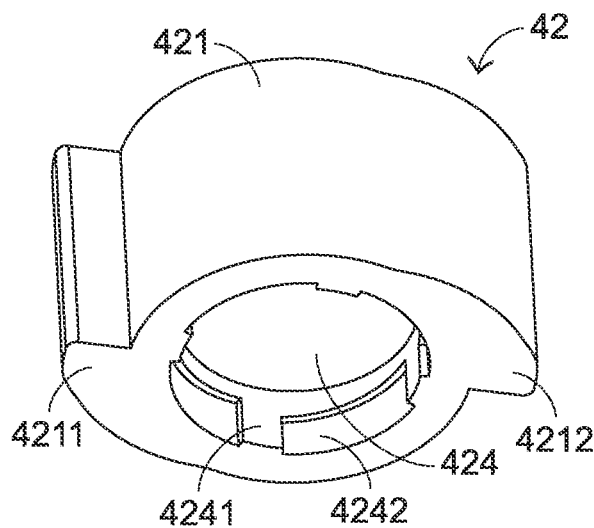
FIG. 15 is a schematic perspective view illustrating the cam of the fixing base and taken along another viewpoint.
Figure 16:
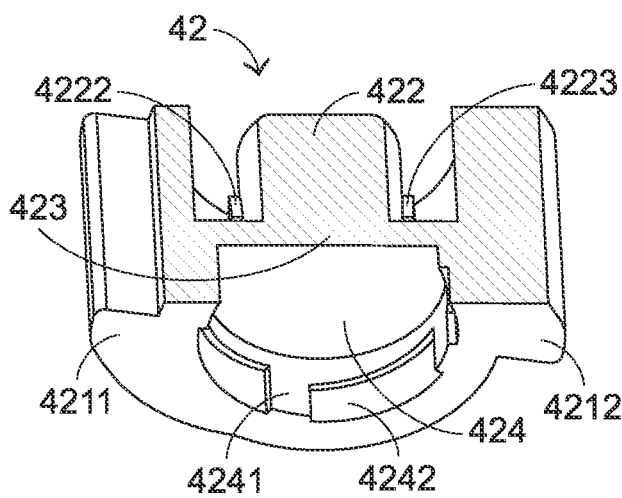
FIG. 16 is a schematic cutaway and perspective illustrating the cam of the fixing base.
Figure 17:
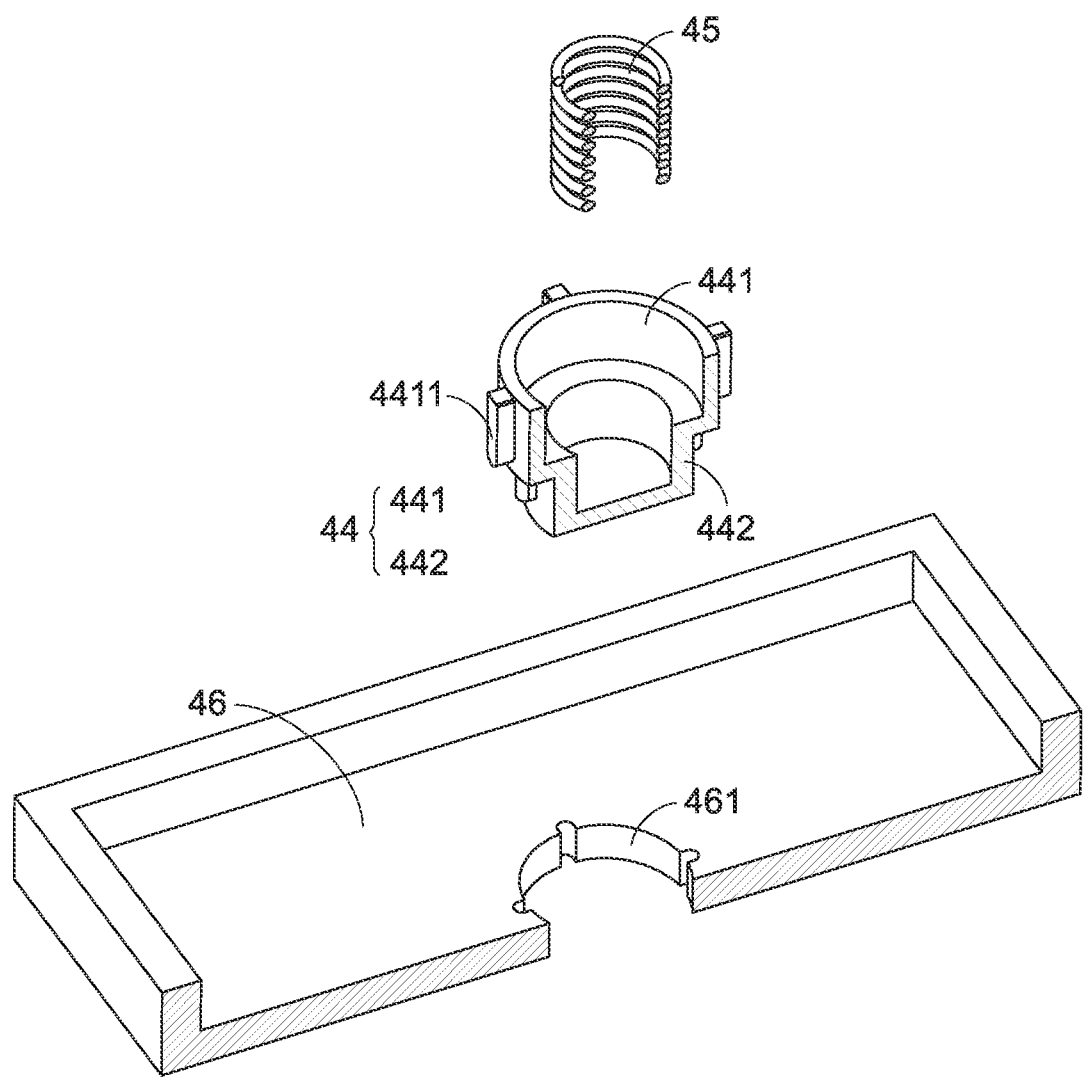
FIG. 17 is a schematic cutaway and exploded view illustrating the second spring, the button and the pedestal of the fixing base.
Figure 18:
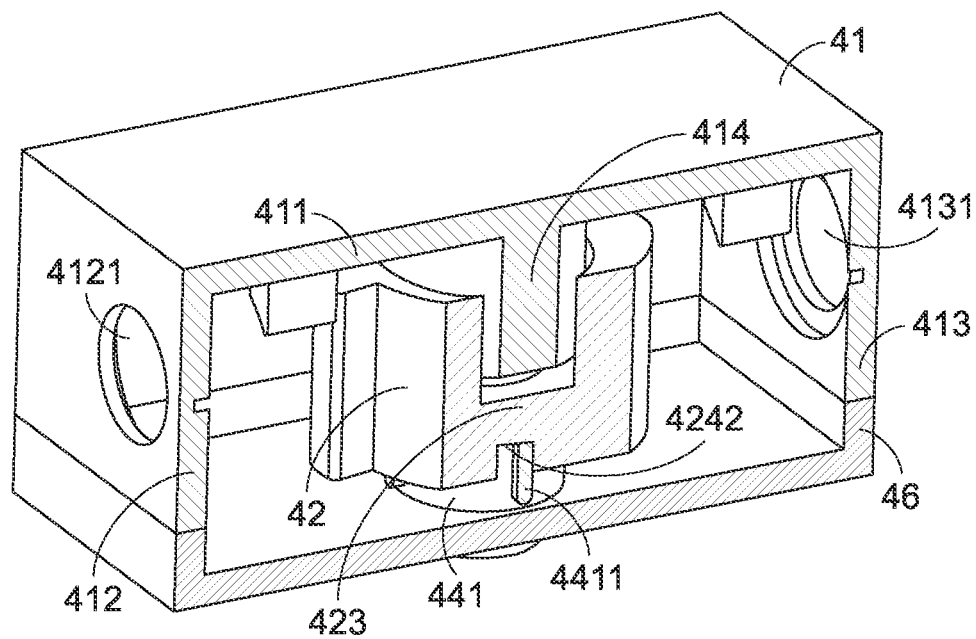
FIG. 18 is a schematic cutaway and perspective view illustrating the cam and the button of the fixing base when the fixing base is in the normal operating mode.
Figure 19:
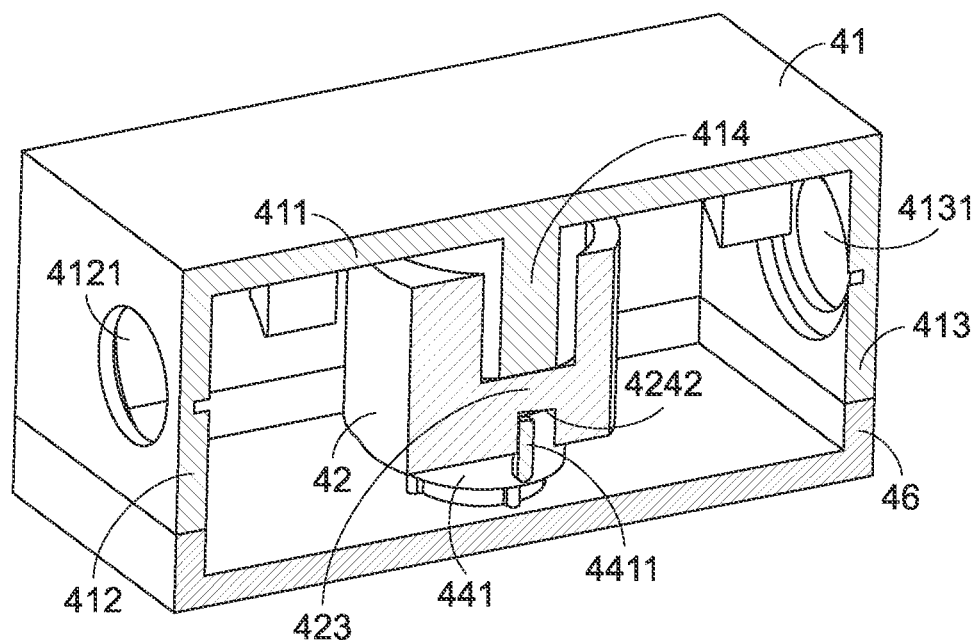
FIG. 19 is a schematic cutaway and perspective view illustrating the cam and the button of the fixing base when the button is upwardly pressed to push the cam.
Figure 20:
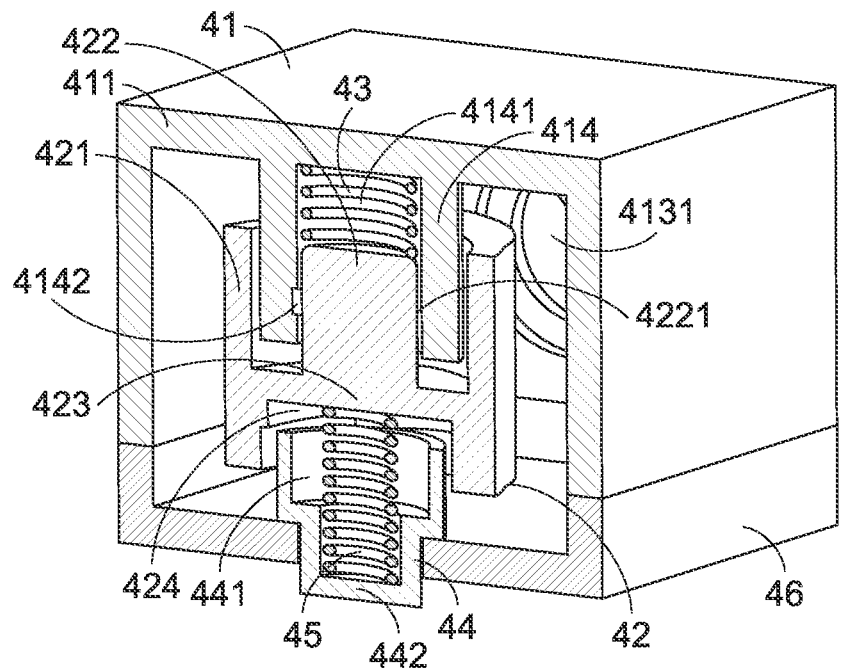
FIG. 20 is a schematic cutaway and perspective view illustrating the cam and the button of the fixing base when the fixing base is in the normal operating mode.
Figure 21:
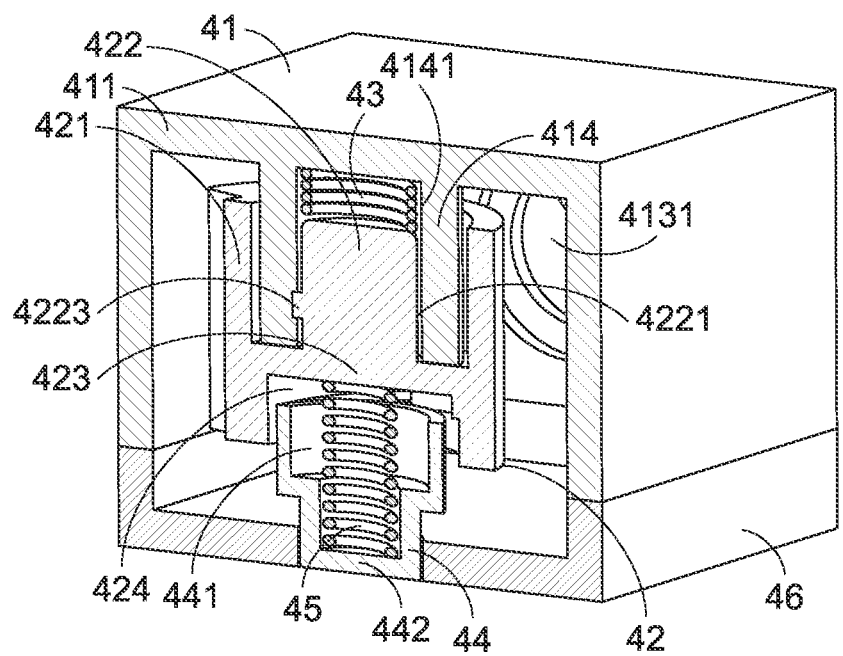
FIG. 21 is a schematic cutaway and perspective view illustrating the cam and the button of the fixing base when the button is upwardly pressed to push the cam.

The present invention provides an electronic assembly. An embodiment of the electronic assembly will be described with reference to FIGS. 1 to 21. FIG. 1 is a schematic exploded view illustrating an electronic assembly according to an embodiment of the present invention. FIG. 2 is a schematic perspective view illustrating the electronic assembly as shown in FIG. 1. FIG. 3 is a schematic perspective view illustrating the electronic assembly as shown in FIG. 2 and taken along another viewpoint. FIG. 4 is a schematic exploded view illustrating a portion of the electronic assembly as shown in FIG. 1. FIG. 5 is a schematic perspective view illustrating a portion of the electronic assembly as shown in FIG. 1. FIG. 6 is a schematic exploded view illustrating a portion of the main body and the fixing base in the electronic device according to the embodiment of the present invention. FIG. 7 is a schematic exploded view illustrating a portion of the main body and the fixing base in the electronic device as shown in FIG. 6 and taken along another viewpoint. FIG. 8 is a schematic perspective view illustrating a portion of the main body and the fixing base of the electronic device according to the embodiment of the present invention. FIG. 9 is a schematic perspective view illustrating the fixing base of the electronic device according to the embodiment of the present invention. FIG. 10 is a schematic cutaway and perspective view illustrating the retractable hooks and the cam of the fixing base when the fixing base is in a normal operating mode. FIG. 11 is a schematic cutaway and perspective view illustrating the retractable hooks and the cam of the fixing base while the external device is installed on the fixing base. FIG. 12 is a schematic cutaway and exploded view illustrating the upper cover, the first spring, the cam, the second spring, the button and the pedestal of the fixing base and taken along a viewpoint. FIG. 13 is a schematic cutaway and exploded view illustrating the upper cover, the first spring, the cam, the second spring, the button and the pedestal of the fixing base and taken along another viewpoint. FIG. 14 is a schematic perspective view illustrating the cam of the fixing base and taken along a viewpoint. FIG. 15 is a schematic perspective view illustrating the cam of the fixing base and taken along another viewpoint. FIG. 16 is a schematic cutaway and perspective view illustrating the cam of the fixing base. FIG. 17 is a schematic cutaway and exploded view illustrating the second spring, the button and the pedestal of the fixing base. FIG. 18 is a schematic cutaway and perspective view illustrating the cam and the button of the fixing base when the fixing base is in the normal operating mode. FIG. 19 is a schematic cutaway and perspective view illustrating the cam and the button of the fixing base when the button is upwardly pressed to push the cam. FIG. 20 is a schematic cutaway and perspective view illustrating the cam and the button of the fixing base when the fixing base is in the normal operating mode. FIG. 21 is a schematic cutaway and perspective view illustrating the cam and the button of the fixing base when the button is upwardly pressed to push the cam.

The electronic assembly 1 comprises an electronic device 2 and an external device 5. For example, the electronic device 2 is a multi-functional docking device, an electronic device with plural connection interfaces or having a power conversion function, or any other appropriate electronic device. Moreover, the external device 5 is a lighting device or a camera.

In an embodiment, the electronic device 2 comprises a main body 3 and a fixing base 4.

The main body 3 comprises a top wall 31 and a bottom plate 32. The top wall 31 has a first opening 311. A portion of the external device 5 is penetrated through the first opening 311 and disposed within the main body 3. An installation slot 321 is formed in the bottom plate 32. The fixing base 4 can be installed in the installation slot 321. The fixing base 4 is disposed within the main body 3 (e.g., disposed on the bottom plate 32) in order to fix the external device 5.

The fixing base 4 comprises an upper cover 41, a cam 42, a first spring 43, a button 44, a second spring 45, a pedestal 46, a first retractable hook 47 and a second retractable hook 48. Due to the cooperation of these components, the external device 5 can be fixed on the electronic device 3 or detached from the electronic device 3 through the fixing base 4.

The upper cover 41 comprises a top wall 411, a first lateral wall 412, a second lateral wall 413 and a hollow post 414. The first lateral wall 412 and the second lateral wall 413 are protruded downwardly from the top wall 411. In addition, the first lateral wall 412 and the second lateral wall 413 are opposed to each other. The first lateral wall 412 has a second opening 4121. The second lateral wall 413 has a third opening 4131.

The hollow post 414 is arranged between the first lateral wall 412 and the second lateral wall 413. The hollow post 414 is protruded downwardly from the top wall 411. The hollow post 414 comprises a first concave structure 4141, a first guiding track 4142 and a second guiding track 4143. The first concave structure 4141 comprises an annular inner wall 41411. The first guiding track 4142 and the second guiding track 4143 are concavely formed in the annular inner wall 41411 and inclinedly arranged. The first guiding track 4142 and the second guiding track 4143 are respectively located at two opposite sides of the annular inner wall 41411. The first guiding track 4142 comprises a first track bottom 41421, a first track top 41422 and a first inlet 41423. The second guiding track 4143 comprises a second track bottom 41431, a second track top 41432 and a second inlet 41433. In this embodiment, the hollow post 414 comprises the two guiding tracks 4142 and 4143. It is noted that the number of the guiding tracks is not restricted. For example, in another embodiment, the hollow post 414 comprises at least one guiding track.

The cam 42 comprises an outer ring 421, a central post 422, a separation structure 423 and a second concave structure 424. The outer ring 421 is arranged around the separation structure 423. In addition, the outer ring 421 and the separation structure 423 are perpendicular to each other. The separation structure 423 is arranged between the central post 422 and the second concave structure 424. The outer ring 421 comprises a first external protrusion structure 4211 and a second external protrusion structure 4212. The first external protrusion structure 4211 and the second external protrusion structure 4212 are externally protruded from the outer ring 421. In other words, the outer diameter of the cam 42 is not uniform. For example, the outer diameter of the cam 42 corresponding to the line passing through the first external protrusion structure 4211 and the second external protrusion structure 4212 is larger, and the outer diameter of the cam 42 passing through any two points of the outer ring 421 is smaller. In addition, the first external protrusion structure 4211 has a first slant surface 42111, and the second external protrusion structure 4212 has a second slant surface 42121.

The central post 422 of the cam 42 comprises an outer wall 4221, a first guiding block 4222 and a second guiding block 4223. The first guiding block 4222 and the second guiding block 4223 are located at two opposite sides of the outer wall 4221. When the central post 422 of the cam 42 is inserted into the hollow post 414 of the upper cover 41, the first guiding block 4222 is introduced into the first track bottom 41421 through the first inlet 41423, and the second guiding block 4223 is introduced into the second track bottom 41431 through the second inlet 41433.

In this embodiment, each of the first guiding block 4222 and the second guiding block 4223 has a triangular cross section. It is noted that the shape of the cross sections of the first guiding block 4222 and the second guiding block 4223 are not restricted. For example, in some other embodiments, each of the first guiding block 4222 and the second guiding block 4223 has a circular cross section, an elliptical cross section or any other appropriate geometric cross section as long as the first guiding block 4222 and the second guiding block 4223 are respectively permitted to be moved along the first guiding track 4142 and the second guiding track 4143. In this embodiment, the central post 422 comprises the two guiding blocks 4222 and 4223. It is noted that the number of the guiding blocks is not restricted. For example, in another embodiment, the central post 422 comprises at least one guiding block.

The second concave structure 424 of the cam 42 comprises an annular inner wall 4241. Moreover, at least one concave slant surface 4242 is formed on the annular inner wall 4241.

The first spring 43 is arranged between the first concave structure 4141 of the hollow post 414 and the central post 422 of the cam 42. After the cam 42 is rotated and thus moved upwardly, the first spring 43 provides an elastic force. In response to the elastic force, the cam 42 can be returned to its original position.

The button 44 is located under the cam 42. The button 44 comprises a head part 441 and a pressing part 442. The head part 441 is located at the side of the button 44 close to the cam 42. The pressing part 442 is located at the side of the button 44 away from the cam 42. The second spring 45 is arranged between the head part 441 of the button 44 and the second concave structure 424 of the cam 42. The first spring 43, the cam 42, the second spring 45 and the head part 441 of the button 44 are accommodated within the space between the upper cover 41 and the pedestal 46. Moreover, at least one guiding rib 4411 is formed on the head part 441 of the button 44. The at least one guiding rib 4411 is aligned with the at least one concave slant surface 4242 of the cam 42. In addition, each guiding rib 4411 can be slid along the corresponding concave slant surface 4242 of the cam 42.

The pedestal 46 comprises a fourth opening 461, a first stopping structure 462 and a second stopping structure 463. The pressing part 442 of the button 44 is exposed outside the fourth opening 461. A portion of the head part 441 of the button 44 is contacted with the inner surface of the fourth opening 461. Another portion of the head part 441 of the button 44 is disposed within the fixing base 4.

The first stopping structure 462 of the pedestal 46 is arranged between the cam 42 and the first lateral wall 412 of the upper cover 41. The first stopping structure 462 comprises a fifth opening 4621. The second stopping structure 463 of the pedestal 46 is arranged between the cam 42 and the second lateral wall 413 of the upper cover 41. The second stopping structure 463 comprises a sixth opening 4631.

Furthermore, the bottom plate 32 of the main body 3 comprises a fifth stopping structure 322 and a sixth stopping structure 323. The fifth stopping structure 322 is located beside the first lateral wall 412 of the upper cover 41 of the fixing base 4. The fifth stopping structure 322 and the first lateral wall 412 are in parallel with each other. Moreover, a first insertion groove 33 is defined by the fifth stopping structure 322 and the first lateral wall 412 collaboratively. The sixth stopping structure 323 is located beside the second lateral wall 413 of the upper cover 41 of the fixing base 4. The sixth stopping structure 323 and the second lateral wall 413 are in parallel with each other. Moreover, a second insertion groove 34 is defined by the sixth stopping structure 323 and the second lateral wall 413 collaboratively.

The first retractable hook 47 is arranged between the first lateral wall 412 of the upper cover 41 and the first stopping structure 462. The first retractable hook 47 comprises a first inclined protrusion structure 471, a third stopping structure 472, a first bolt 473 and a third spring 474. The first inclined protrusion structure 471 is protruded out through the second opening 4121 of the first lateral wall 412. The third stopping structure 472 is arranged between the first inclined protrusion structure 471 and the first bolt 473. The first bolt 473 is penetrated through the fifth opening 4621 of the first stopping structure 462 and contacted with the outer ring 421 of the cam 42. The third spring 474 is arranged between the first lateral wall 412 of the upper cover 41 and the third stopping structure 472.

The second retractable hook 48 is arranged between the second lateral wall 413 of the upper cover 41 and the second stopping structure 463. The second retractable hook 48 comprises a second inclined protrusion structure 481, a fourth stopping structure 482, a second bolt 483 and a fourth spring 484. The second inclined protrusion structure 481 is protruded out through the third opening 4131 of the second lateral wall 413. The fourth stopping structure 482 is arranged between the second inclined protrusion structure 481 and the second bolt 483. The second bolt 483 is penetrated through the sixth opening 4631 of the second stopping structure 463 and contacted with the outer ring 421 of the cam 42. The fourth spring 484 is arranged between the second lateral wall 413 of the upper cover 41 and the fourth stopping structure 482.

Please refer to FIG. 10. When the first guiding block 4222 of the cam 42 is located at the first track bottom 41421, the first bolt 473 is pushed by the first external protrusion structure 4211 of the cam 42. Consequently, the first inclined protrusion structure 471 is protruded out of the second opening 4121. As the first guiding block 4222 of the cam 42 is moved in the direction from the first track bottom 41421 to the first track top 41422, the cam 42 is correspondingly rotated. Moreover, as shown in FIG. 11, the first bolt 473 and the first external protrusion structure 4211 are separated from each other. Under this circumstance, the first inclined protrusion structure 471 is retracted back into the second opening 4121. As the first guiding block 4222 of the cam 42 is moved in the direction from the first track top 41422 to the first track bottom 41421, the cam 42 is rotated reversely. Consequently, as shown in FIG. 10, the first external protrusion structure 4211 is contacted with the first bolt 473 again. Similarly, the movement of the first bolt 473 results in the rotation of the cam 42.

Please refer to FIG. 10 again. When the second guiding block 4223 of the cam 42 is located at the second track bottom 41431, the second bolt 483 is pushed by the second external protrusion structure 4212 of the cam 42. Consequently, the second inclined protrusion structure 481 is protruded out of the third opening 4131. As the second guiding block 4223 of the cam 42 is moved in the direction from the second track bottom 41431 to the second track top 41432, the cam 42 is correspondingly rotated. Moreover, as shown in FIG. 11, the second bolt 483 and the second external protrusion structure 4212 are separated from each other. Under this circumstance, the second inclined protrusion structure 481 is retracted back into the third opening 4131. As the second guiding block 4223 of the cam 42 is moved in the direction from the second track top 41432 to the second track bottom 41431, the cam 42 is rotated reversely. Consequently, as shown in FIG. 10, the second external protrusion structure 4212 is contacted with the second bolt 483 again. Similarly, the movement of the second bolt 483 results in the rotation of the cam 42.

When the first bolt 473 is pushed by the first external protrusion structure 4211 of the cam 42 and the first inclined protrusion structure 471 is protruded out of the second opening 4121 (i.e., in the situation of FIG. 10), the third spring 474 is compressed. Moreover, when the first external protrusion structure 4211 is separated from the first bolt 473 in response to the rotation of the cam 42 (i.e., in the situation of FIG. 11), the third spring 474 is released. Consequently, the first inclined protrusion structure 471 is retracted back into the second opening 4121. Similarly, when the second bolt 483 is pushed by the second external protrusion structure 4212 of the cam 42 and the second inclined protrusion structure 481 is protruded out of the third opening 4131 (i.e., in the situation of FIG. 10), the fourth spring 484 is compressed. Similarly, when the second external protrusion structure 4212 is separated from the second bolt 483 in response to the rotation of the cam 42 (i.e., in the situation of FIG. 11), the fourth spring 484 is released. Consequently, the second inclined protrusion structure 481 is retracted back into the third opening 4131.

The external device 5 comprises a bracket 51. The bracket 51 comprises a first insertion piece 511 and a second insertion piece 512. The bracket 51 and the fixing base 4 are combined together and fixed on each other through the first insertion piece 511 and the second insertion piece 512. The first insertion piece 511 comprises a seventh opening 5111. The second insertion piece 512 comprises an eighth opening 5121.

A process of installing the external device 5 on the electronic device 2 will be described as follows.

Firstly, the first insertion piece 511 is inserted into the first insertion groove 33, and the second insertion piece 512 is inserted into the second insertion groove 34. When the first inclined protrusion structure 471 of the first retractable hook 47 is pressed by the first insertion piece 511, the first inclined protrusion structure 471 is retracted back into the second opening 4121. Since the first bolt 473 is moved inwardly to push the first external protrusion structure 4211 of the cam 42, the cam 42 is correspondingly rotated. Similarly, when the second inclined protrusion structure 481 of the second retractable hook 48 is pressed by the second insertion piece 512, the second inclined protrusion structure 481 is retracted back into the third opening 4131. Since the second bolt 483 is moved inwardly to push the second external protrusion structure 4212 of the cam 42, the cam 42 is correspondingly rotated. As mentioned above, the first external protrusion structure 4211 has the first slant surface 42111, and the second external protrusion structure 4212 has the second slant surface 42122. Due to the slant surfaces 42111 and 42122, the cam 42 is rotated when the first external protrusion structure 4211 and the second external protrusion structure 4212 can be respectively pushed by the first bolt 473 and the second bolt 483.

Then, the first insertion piece 511 is continuously and downwardly inserted into the first insertion groove 33, and the second insertion piece 512 is continuously and downwardly inserted into the second insertion groove 34. When the seventh opening 5111 of the first insertion piece 511 is aligned with the second opening 4121, the retracted first inclined protrusion structure 471 is protruded out of the second opening 4121 and inserted into the seventh opening 5111. Similarly, when the eighth opening 5121 of the second insertion piece 512 is aligned with the third opening 4131, the retracted second inclined protrusion structure 481 is protruded out of the third opening 4131 and inserted into the eighth opening 5121. When the first inclined protrusion structure 471 is inserted into the seventh opening 5111 and the second inclined protrusion structure 481 is inserted into the eighth opening 5121. Under this circumstance, the bracket 51 of the external device 5 is installed on the main body 3 of the electronic device 2.

By upwardly pressing the button 44, the bracket 51 can be detached from the fixing base 4. Hereinafter, a process of detaching the external device 2 from the electronic device 2 by the user will be described with reference to FIGS. 18 to 21. Firstly, the pressing part 442 of the button 44 is upwardly pressed by the user, and the head part 441 is moved upwardly to push the cam 42. Consequently, the first guiding block 4222 of the cam 42 is moved in the direction from the first track bottom 41421 to the first track top 41422, and the cam 42 is correspondingly rotated. As the cam 42 is rotated, the first bolt 473 and the first external protrusion structure 4211 are separated from each other, and the first bolt 473 is moved in the direction toward the inner portion of the fixing base 4. Consequently, the first inclined protrusion structure 471 is retracted back into the second opening 4121. Similarly, the second bolt 483 and the second external protrusion structure 4212 are separated from each other, and the second bolt 483 is moved in the direction toward the inner portion of the fixing base 4. Consequently, the second inclined protrusion structure 481 is retracted back into the third opening 4131. After the first inclined protrusion structure 471 is retracted back into the second opening 4121 and the second inclined protrusion structure 481 is retracted back into the third opening 4131, the user uplifts the bracket 51. Consequently, the first insertion piece 511 and the second insertion piece 512 are respectively detached from the first insertion groove 33 and the second insertion groove 34.

Moreover, while the button 44 is upwardly pressed by the user, the guiding rib 4411 on the head part 441 of the button 44 is contacted with the concave slant surface 4242 of the cam 42. Since the cam 42 is assured to be moved upwardly, the rotatable range of the cam 42 can be limited.

When the button 44 is no longer pressed by the user, the cam 42 is returned to its original position in response to the elastic force of the first spring 43, and the button 44 is returned to its original position in response to the elastic force of the second spring 45 and protrude out of the fourth opening 461.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An electronic assembly, comprising:
an electronic device comprising a main body and a fixing base, wherein the main body comprises a first opening, the fixing base is disposed within the main body, and the fixing base comprises:
an upper cover comprising a top wall, a first lateral wall, a second lateral wall and a hollow post, wherein the first lateral wall and the second lateral wall are protruded downwardly from the top wall, the first lateral wall and the second lateral wall are opposed to each other, the first lateral wall has a second opening, and the second lateral wall has a third opening, wherein the hollow post is arranged between the first lateral wall and the second lateral wall, the hollow post is protruded downwardly from the top wall, and the hollow post comprises a first concave structure and a first guiding track, wherein the first concave structure comprises an annular inner wall, the first guiding track is concavely and inclinedly formed in the annular inner wall, and the first guiding track comprises a first track bottom, a first track top and a first inlet;
a cam comprising an outer ring, a central post, a separation structure and a second concave structure, wherein the outer ring is arranged around the separation structure and perpendicular to the separation structure, the separation structure is arranged between the central post and the second concave structure, the outer ring comprises a first external protrusion structure and a second external protrusion structure, the central post comprises an outer wall and a first guiding block, and the first guiding block is disposed on the outer wall, wherein when the central post is upwardly inserted into the hollow post, the first guiding block is introduced into the first track bottom through the first inlet;
a first spring arranged between the first concave structure and the central post;
a button located under the cam, and comprising a head part and a pressing part;
a second spring arranged between the head part of the button and the second concave structure;
a pedestal, wherein the first spring, the cam, the second spring and the head part of the button are accommodated within a space between the upper cover and the pedestal, and the pedestal comprises a fourth opening, a first stopping structure and a second stopping structure, wherein the pressing part of the button is exposed outside the fourth opening, a portion of the head part is contacted with an inner surface of the fourth opening, the first stopping structure is arranged between the cam and the first lateral wall, the first stopping structure comprises a fifth opening, the second stopping structure is arranged between the cam and the second lateral wall, and the second stopping structure comprises a sixth opening;
a first retractable hook arranged between the first lateral wall and the first stopping structure, and comprising a first inclined protrusion structure, a third stopping structure, a first bolt and a third spring, wherein the first inclined protrusion structure is protruded out through the second opening, the third stopping structure is arranged between the first inclined protrusion structure and the first bolt, the first bolt is penetrated through the fifth opening and contacted with the outer ring, and the third spring is arranged between the first lateral wall and the third stopping structure; and
a second retractable hook arranged between the second lateral wall and the second stopping structure, and comprising a second inclined protrusion structure, a fourth stopping structure, a second bolt and a fourth spring, wherein the second inclined protrusion structure is protruded out through the third opening, the fourth stopping structure is arranged between the second inclined protrusion structure and the second bolt, the second bolt is penetrated through the sixth opening and contacted with the outer ring, and the fourth spring is arranged between the second lateral wall and the fourth stopping structure; and
an external device comprising a bracket, wherein the bracket comprises a first insertion piece and a second insertion piece, the first insertion piece comprises a seventh opening, and the second insertion piece comprises an eighth opening, wherein when the external device is installed on the electronic device, the first insertion piece and the second insertion piece are penetrated through the first opening, the first inclined protrusion structure is inserted into the seventh opening, and the second inclined protrusion structure is inserted into the eighth opening.

2. The electronic assembly according to claim 1, wherein when the first guiding block of the cam is located at the first track bottom, the first bolt is pushed by the first external protrusion structure, so that the first inclined protrusion structure is protruded out of the second opening, wherein while the first guiding block of the cam is moved in a direction from the first track bottom to the first track top, the cam is correspondingly rotated, and the first external protrusion structure and the first bolt are separated from each other, so that the first inclined protrusion structure is retracted back into the second opening.

3. The electronic assembly according to claim 2, wherein when the pressing part of the button is pressed, the button is moved to push the cam, so that the first guiding block of the cam is moved in the direction from the first track bottom to the first track top, wherein when the button is not pressed, the cam is returned to an original position of the cam through the first spring, and the button is returned to an original position of the button through the second spring.

4. The electronic assembly according to claim 2, wherein when the first bolt is pushed by the first external protrusion structure and the first inclined protrusion structure is protruded out of the second opening, the third spring is compressed, wherein when the cam is rotated and the first external protrusion structure and the first bolt are separated from each other, the third spring is released, so that the first inclined protrusion structure is retracted back into the second opening.

5. The electronic assembly according to claim 1, wherein the main body further comprises a bottom plate, and the bottom plate comprises a fifth stopping structure and a sixth stopping structure, wherein the fifth stopping structure is located beside the first lateral wall and in parallel with the first lateral wall, and a first insertion groove is defined by the fifth stopping structure and the first lateral wall collaboratively, wherein the sixth stopping structure is located beside the second lateral wall and in parallel with the second lateral wall, and a second insertion groove is defined by the sixth stopping structure and the second lateral wall collaboratively.

6. The electronic assembly according to claim 5, wherein while the external device is installed on the electronic device, the first insertion piece is inserted into the first insertion groove, and the first inclined protrusion structure is pressed by the first insertion piece, so that the first inclined protrusion structure is retracted back into the second opening, wherein when the first insertion piece is continuously inserted into the first insertion groove and the seventh opening is aligned with the second opening, the first inclined protrusion structure is protruded out of the second opening and inserted into the seventh opening.

7. The electronic assembly according to claim 1, wherein the hollow post further comprises a second guiding track, and the central post further comprises a second guiding block, wherein the second guiding track is concavely and inclinedly formed in the annular inner wall, the second guiding track comprises a second track bottom, a second track top and a second inlet, and the second guiding block is disposed on the outer wall, wherein when the central post is upwardly inserted into the hollow post, the second guiding block is introduced into the second track bottom through the second inlet.

8. The electronic assembly according to claim 7, wherein when the second guiding block of the cam is located at the second track bottom, the second bolt is pushed by the second external protrusion structure, so that the second inclined protrusion structure is protruded out of the third opening, wherein while the second guiding block of the cam is moved in a direction from the second track bottom to the second track top, the cam is correspondingly rotated, and the second external protrusion structure and the second bolt are separated from each other, so that the second inclined protrusion structure is retracted back into the third opening.

9. The electronic assembly according to claim 8, wherein when the pressing part of the button is pressed, the head part of button is moved to push the cam, so that the first guiding block of the cam is moved in the direction from the first track bottom to the first track top and the second guiding block of the cam is moved in the direction from the second track bottom to the second track top, wherein when the button is not pressed, the cam is returned to an original position of the cam through the first spring, and the button is returned to an original position of the button through the second spring.

10. The electronic assembly according to claim 1, wherein the electronic device is a multi-functional docking device, and the external device is a lighting device or a camera.

\* \* \* \* \*